US007680824B2

(12) United States Patent
Plastina et al.

(10) Patent No.: US 7,680,824 B2
(45) Date of Patent: Mar. 16, 2010

(54) SINGLE ACTION MEDIA PLAYLIST GENERATION

(75) Inventors: Daniel Plastina, Sammamish, WA (US);
Jonathan M. Cain, Seattle, WA (US);
Michael Novak, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 105 days.

(21) Appl. No.: 11/201,960

(22) Filed: Aug. 11, 2005

(65) Prior Publication Data
US 2007/0038672 A1 Feb. 15, 2007

(51) Int. Cl.
*G06F 17/30* (2006.01)
(52) U.S. Cl. ............... 707/104.1; 705/27; 715/764; 715/765; 345/792
(58) Field of Classification Search .......... 707/10; 715/65, 810, 764–765; 709/104.1, 204, 219, 709/242; 705/27; 345/792
See application file for complete search history.

(56) References Cited

U.S. PATENT DOCUMENTS

| 5,616,876 A * | 4/1997 | Cluts ........................... 84/609 |
| 5,749,081 A | 5/1998 | Whiteis |
| 5,953,005 A | 9/1999 | Liu |
| 6,041,311 A | 3/2000 | Chislenko et al. |
| 6,118,450 A | 9/2000 | Proehl et al. |
| 6,243,725 B1 | 6/2001 | Hempleman et al. |
| 6,311,194 B1 | 10/2001 | Sheth et al. |
| 6,345,256 B1 | 2/2002 | Milsted et al. |
| 6,356,971 B1 | 3/2002 | Katz et al. |
| 6,408,301 B1 | 6/2002 | Patton et al. |
| 6,438,579 B1 | 8/2002 | Hosken |
| 6,446,080 B1 * | 9/2002 | Van Ryzin et al. ....... 707/104.1 |
| 6,452,609 B1 | 9/2002 | Katinsky et al. |
| 6,453,336 B1 | 9/2002 | Beyda et al. |
| 6,453,339 B1 | 9/2002 | Schultz et al. |
| 6,496,802 B1 * | 12/2002 | van Zoest et al. ............ 705/14 |
| 6,526,411 B1 | 2/2003 | Ward |
| 6,539,395 B1 | 3/2003 | Gjerdingen et al. |

(Continued)

FOREIGN PATENT DOCUMENTS

EP 1189437 A1 3/2002

(Continued)

OTHER PUBLICATIONS

Abe Hideo, System for Automatic Selection of Music, Method for Automatic Selection of Music and Storage Medium, Patent Abstract of Japan, Publication No. 2002-073041, Publication Date Mar. 12, 2002.*

(Continued)

*Primary Examiner*—Don Wong
*Assistant Examiner*—Sheree N Brown
(74) *Attorney, Agent, or Firm*—Senniger Powers LLP

(57) ABSTRACT

A method for generating a list of media items selected from a library of media items in response to only a single action being performed. The method displays information identifying a portion of the library of media items and selects a group of media items from the portion of the library in response to only a single action. By utilizing only a portion of the media items in the library, the generated list of media items is desirable to a user by excluding less desirable media items.

13 Claims, 15 Drawing Sheets

U.S. PATENT DOCUMENTS

| | | | |
|---|---|---|---|
| 6,545,209 B1 | 4/2003 | Flannery et al. | |
| 6,587,127 B1 * | 7/2003 | Leeke et al. | 715/765 |
| 6,605,770 B2 * | 8/2003 | Yamane et al. | 84/609 |
| 6,657,117 B2 | 12/2003 | Weare et al. | |
| 6,721,741 B1 | 4/2004 | Eyal et al. | |
| 6,731,312 B2 * | 5/2004 | Robbin | 715/792 |
| 6,748,395 B1 | 6/2004 | Picker et al. | |
| 6,760,721 B1 | 7/2004 | Chasen et al. | |
| 6,771,568 B2 | 8/2004 | Hochendoner | |
| 6,772,408 B1 | 8/2004 | Velonis et al. | |
| 6,933,433 B1 * | 8/2005 | Porteus et al. | 84/615 |
| 6,941,324 B2 | 9/2005 | Plastina et al. | |
| 6,973,451 B2 | 12/2005 | Laronne et al. | |
| 6,987,221 B2 * | 1/2006 | Platt | 84/601 |
| 6,996,390 B2 | 2/2006 | Herley et al. | |
| 7,043,525 B2 | 5/2006 | Tuttle et al. | |
| 7,227,073 B2 * | 6/2007 | Kim | 84/609 |
| 7,231,381 B2 * | 6/2007 | Li et al. | 707/3 |
| 7,243,307 B2 * | 7/2007 | Gao et al. | 715/744 |
| 7,283,992 B2 * | 10/2007 | Liu et al. | 707/3 |
| 7,426,537 B2 * | 9/2008 | Lee et al. | 709/204 |
| 2001/0031066 A1 | 10/2001 | Meyer et al. | |
| 2002/0001395 A1 | 1/2002 | Davis et al. | |
| 2002/0033844 A1 | 3/2002 | Levy et al. | |
| 2002/0041692 A1 | 4/2002 | Seto et al. | |
| 2002/0055951 A1 | 5/2002 | Shigetomi et al. | |
| 2002/0059584 A1 | 5/2002 | Ferman et al. | |
| 2002/0069218 A1 | 6/2002 | Sull et al. | |
| 2002/0087565 A1 | 7/2002 | Hoekman et al. | |
| 2002/0099694 A1 | 7/2002 | Diamond et al. | |
| 2002/0099737 A1 | 7/2002 | Porter et al. | |
| 2002/0103796 A1 | 8/2002 | Hartley | |
| 2002/0103920 A1 | 8/2002 | Berkun et al. | |
| 2002/0113824 A1 | 8/2002 | Myer | |
| 2002/0120925 A1 | 8/2002 | Logan | |
| 2002/0143976 A1 | 10/2002 | Barker et al. | |
| 2002/0146235 A1 | 10/2002 | Watanabe et al. | |
| 2002/0147728 A1 | 10/2002 | Goodman et al. | |
| 2002/0157095 A1 | 10/2002 | Masumitsu et al. | |
| 2002/0184180 A1 | 12/2002 | Debique et al. | |
| 2002/0196976 A1 | 12/2002 | Mihcak et al. | |
| 2003/0033420 A1 | 2/2003 | Eyal et al. | |
| 2003/0036948 A1 | 2/2003 | Woodward et al. | |
| 2003/0045953 A1 | 3/2003 | Weare | |
| 2003/0045954 A1 | 3/2003 | Weare et al. | |
| 2003/0105743 A1 | 6/2003 | Ireton | |
| 2003/0120928 A1 | 6/2003 | Cato et al. | |
| 2003/0135513 A1 | 7/2003 | Quinn et al. | |
| 2003/0182254 A1 | 9/2003 | Plastina et al. | |
| 2003/0182255 A1 | 9/2003 | Plastina et al. | |
| 2003/0182315 A1 | 9/2003 | Plastina et al. | |
| 2003/0221541 A1 | 12/2003 | Platt | |
| 2003/0225777 A1 | 12/2003 | Marsh | |
| 2003/0225834 A1 * | 12/2003 | Lee et al. | 709/204 |
| 2003/0229537 A1 * | 12/2003 | Dunning et al. | 705/10 |
| 2003/0236582 A1 | 12/2003 | Zamir et al. | |
| 2003/0236695 A1 | 12/2003 | Litwin, Jr. | |
| 2004/0006575 A1 | 1/2004 | Visharam et al. | |
| 2004/0017997 A1 | 1/2004 | Cowgill | |
| 2004/0059795 A1 | 3/2004 | Ramey | |
| 2004/0060426 A1 | 4/2004 | Weare et al. | |
| 2004/0064476 A1 | 4/2004 | Rounds | |
| 2004/0086268 A1 | 5/2004 | Radha et al. | |
| 2004/0123725 A1 | 7/2004 | Kim | |
| 2004/0128308 A1 | 7/2004 | Obrador | |
| 2004/0172593 A1 | 9/2004 | Wong et al. | |
| 2004/0186993 A1 | 9/2004 | Risan et al. | |
| 2004/0210533 A1 | 10/2004 | Picker et al. | |
| 2004/0254659 A1 | 12/2004 | Bolas et al. | |
| 2004/0260786 A1 | 12/2004 | Barile | |
| 2004/0267693 A1 | 12/2004 | Lowe et al. | |
| 2005/0021500 A1 | 1/2005 | Plastina et al. | |
| 2005/0033657 A1 | 2/2005 | Herrington et al. | |
| 2005/0098023 A1 * | 5/2005 | Toivonen et al. | 84/615 |
| 2005/0229225 A1 | 10/2005 | Klausberger et al. | |
| 2005/0234958 A1 | 10/2005 | Sipusic et al. | |
| 2005/0240661 A1 * | 10/2005 | Heller et al. | 709/219 |
| 2005/0262151 A1 * | 11/2005 | Plastina et al. | 707/104.1 |
| 2005/0278377 A1 * | 12/2005 | Mirrashidi et al. | 707/104.1 |
| 2005/0278726 A1 | 12/2005 | Cano et al. | |
| 2006/0032363 A1 | 2/2006 | Platt | |
| 2006/0156236 A1 * | 7/2006 | Heller et al. | 715/716 |
| 2006/0168340 A1 * | 7/2006 | Heller et al. | 709/242 |
| 2006/0212478 A1 * | 9/2006 | Plastina et al. | 707/104.1 |
| 2006/0271989 A1 | 11/2006 | Glaser et al. | |
| 2008/0263476 A1 * | 10/2008 | Vignoli et al. | 715/810 |

FOREIGN PATENT DOCUMENTS

| | | |
|---|---|---|
| GB | 2380378 A | 4/2003 |
| JP | 06-236251 | 8/1994 |
| JP | 11-184481 | 7/1999 |
| JP | 2002-025182 | 1/2002 |
| JP | 2002-108350 | 4/2002 |
| JP | 2003-077214 | 3/2003 |
| JP | 2003-242068 | 8/2003 |
| JP | 2005-502977 | 1/2005 |
| WO | 0128222 A2 | 4/2001 |
| WO | 03023781 A1 | 3/2003 |

OTHER PUBLICATIONS

Website http://www.gracenote.com/gn_productos/playlists.html, Gracenote Playlist, Dec. 1, 2003, pp. 1-3.*

Musicmatch, MusicMatch Jukebox User Guide, Feburary 7, 2003, 55 pp., Chapters A1-A6 & 1-9, published by MusicMatch (republished by Internet Archive WayBackMachine).

Edward Swierk, et al., The Roma Personal Metadata Service, Mobile Networks and Applications vol. 7, pp. 407-418, 2002.

* cited by examiner

FIG. 10

WINDOWS MEDIA PLAYER

| NOW PLAYING | BROWSE | RIP | BURN | SYNC |

▽ AUDIO ▽ LOCAL LIBRARY ▽ SONGS — 213

MSDEFAULT SERVICE — 25D

TYPE TO SEARCH 🔍

NOW PLAYING LIST▽ — 219

33 ITEMS

DRAG ITEMS HERE
TO BUILD A LIST OF
ITEMS TO PLAY, OR
CLICK HERE
TO PLAY "SONGS"
SHUFFLED BY
FAVORITES

LOCAL LIBRARY
 SONGS
 ARTIST
 ALBUM
 GENRE
 YEAR
 RATING

GREATEST CO...
MY PLAYLISTS

| ALBUM | | TITLE | LENGTH | RATING | CONTRIBUTING ARTIST |
|---|---|---|---|---|---|
| | 9 | EXLODER | 3:25 | ★★★★★ | AUDIOSLAVE |
| | 11 | BRING EM... | 5:29 | ★★★★★ | AUDIOSLAVE |
| | 12 | LIGHT MY WAY | 5:03 | ★★★★★ | AUDIOSLAVE |
| | 13 | GETAWAY CAR | 4:59 | ★★★★★ | AUDIOSLAVE |
| | 14 | THE LAST RE... | 5:17 | ★★★★★ | AUDIOSLAVE |
| CREED | | ARE YOU... | 4:44 | ★★★★★ | CREED |
| ▶HUMAN CLAY! | | WHAT IF | 5:18 | ★★★★★ | CREED |
| PLAY | | BEAUTIFUL | 4:19 | ★★★★★ | CREED |
| ADD TO LIST | | SAY I | 5:15 | ★★★★★ | CREED |
| ADD FAVORITES TO LIST | △ | WRONG WAY | 4:19 | ★★★★★ | CREED |
| | | FACELESS... | 5:58 | ★★★★★ | CREED |
| EDIT | | NEVER DIE | 4:51 | ★★★★★ | CREED |
| RATE | | WITH ARMS... | 4:34 | ★★★★★ | CREED |
| DELETE | | | | | |
| OPEN CONTAINING FOLDER | 2 | ONE MORE... | 5:20 | ★★★★★ | CREED |
| | 3 | AERODYN... | 3:27 | ★★★★★ | CREED |
| EVE 6 | 4 | DIGITAL... | 4:58 | ★★★★★ | CREED |
| ROCK | | HARDER, B... | 3:44 | ★★★★★ | CREED |
| 1998 | 5 | CRESCEN... | 3:31 | ★★★★★ | CREED |

233, 231, 207, 209

ANDREW FARRISS

SINGLE ACTION MEDIA PLAYLIST GENERATION

BACKGROUND

Due to recent advances in technology, computing device users are now able to enjoy many features that provide an improved user experience, such as playing various media and multimedia content on personal, laptop, or handheld computers, as well as mobile phones and other portable media devices. In some multimedia environments, a computing device has access to a computer-readable medium storing media files such as Moving Picture Experts Group audio layer-3 (MP3) files and Windows® Media technologies audio (WMA) and video files. The computing device typically organizes the media files into playlists when the compressed media files are played on the computer, but constructing such playlists can be a laborious activity many users will avoid. Avoidance of playlist creation can limit the enjoyment of the media items by the user.

Some types of users would prefer to have a playlist of media items generated automatically, much as if they were listening to broadcast radio programming, where all media items enjoyed share a similar sound or style. Such users may have access to large libraries of media items, but lack the skill or time required to organize them into meaningful playlists. Conventional automated playlist generation includes creating playlists based upon data information related to media files, such as artist name or musical genre. These automated techniques are useful, but lack the sophistication to create a playlist of media items based upon the audio characteristics of particular media items themselves. In addition, some users may only know what music they like when listening to it, having no idea what the name of the song or the artist is. Such a user would benefit from a method whereby a playlist could be automatically generated at the user's request based upon a media item currently being played by a user. A playlist automatically and continuously generated based upon the sound of one or more media items of high desirability would be a useful tool.

Other types of users would prefer to have a playlist of media items generated with some help, while still maintaining some control over the media items selected for the playlist. Such users may also have access to large libraries of media items, but may wish to limit their generated playlists to particular portions of the media library. Conventional automated playlist generation includes creating playlists based upon data information related to media files, such as artist name or musical genre. These automated techniques are useful, but lack the sophistication to create a playlist of media items that exclude unwanted portions of the media library under user control. In addition, controlling conventional automated playlist generation typically requires several actions by the user to ensure inclusion of particular items and exclusion of others. A playlist automatically generated that excludes unwanted portions of the media library and is based upon a single user action would be a useful tool.

SUMMARY

The following simplified summary provides a basic overview of some aspects of the present technology. This summary is not an extensive overview. It is not intended to identify key or critical elements or to delineate the scope of this technology. This Summary is not intended to be used as an aid in determining the scope of the claimed subject matter. Its purpose is to present some simplified concepts related to the technology before the more detailed description presented below.

Accordingly, methods for generating a list of desirable media based upon a single action are disclosed. A user of the method performs a single action relating to a portion of media and the method selects media items from the portion and creates a list of such media items.

BRIEF DESCRIPTION OF THE DRAWINGS

FIGS. 7-14 are exemplary user interfaces of the present invention; and

Corresponding reference characters indicate corresponding parts throughout the drawings.

DETAILED DESCRIPTION

Figure 1:
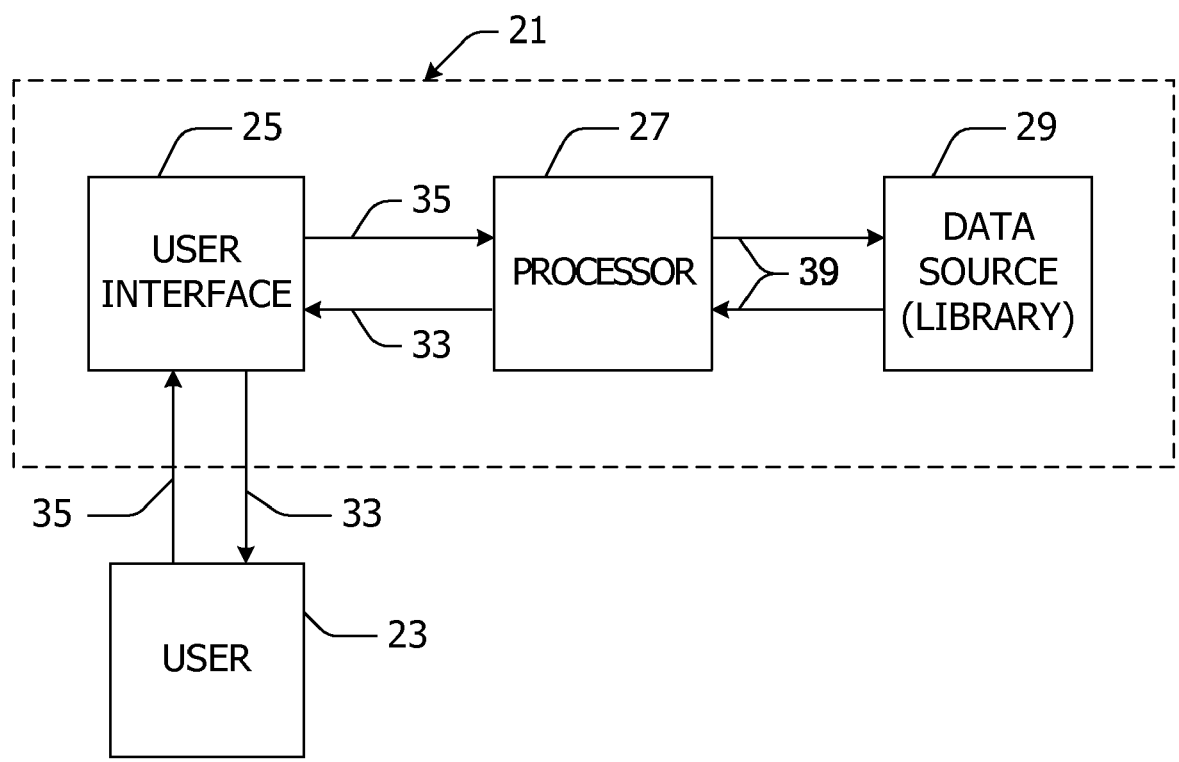
FIG. 1 is a diagram of a system of one embodiment of the present invention for generating playlists of media items based upon one or more seed media items.

Referring now to FIG. 1, a system, generally indicated at 21, is disclosed for facilitating a user 23 in generating a list of media items from a library of media items based upon one or more seed media items. In one example, the user 23 may desire that the system collect desirable media items for use in a playlist of media items related to one or more seed media items. As used herein, the term media item comprises media files of multiple formats, including, music, speeches, audio books, news reports, movies, movie trailers, audio blogs, radio stations, television shows, images, and comedy routines, among others. As used herein, the term playlist means an ordered list of media items for the user 23 to play (in the case of music or video) or access (in the case of images or text files). In one example, the user 23 may utilize a media player program on a computer 130 (see FIG. 6) to access the playlist of media items. An example of such a media player is the Windows® Media Player 10 by Microsoft Corporation of Redmond, Wash.

The system 21 depicted in FIG. 1 comprises several components, including a user interface 25, a processor 27, and a data source 29 containing the library of media items. The user interface 25 provides information 33 to the user 23 and receives instructions 35 from the user. The system data source, or library, 29 either stores a number of media items for use by the user 23 (i.e., a library) or provides a listing of what media items are available along with how to access such media items (e.g., data links) for use by the user. In one example, the media items contained in the library 29 are defined by the user 23. Such a library 29 may be stored on a user's computer 130 (see FIG. 15), a portable media playing device (e.g., an MP3 player), a storage device (e.g., a flash memory device), or virtually any other data source. In another example, a service provider maintains a large library 29 of media items at a separate storage facility (e.g., a server) for streaming to the user 23 upon request. In yet another example, the library 29 may be defined by both a user's personal library of media items and the media items provided by a service provider. In any case, however, the library 29 acts as a repository for media items of potential of interest to the user 23. Such libraries of media items may be very large, containing many tens, hundreds, or thousands of media items, making it difficult to review or recall each of the media items when constructing a playlist.

The processor 27 of the system is adapted for performing the actions described below with respect to the methods described herein. The processor receives 35 instructions and selections from the user 23 through the user interface 25. The processor 27 provides information 33 to the user 23 through the user interface 25. The processor 27 communicates 39 with the data source 29 to access candidate media items. The detailed operation of the system 21 will be described in greater detail below with respect to the methods of the described herein.

As would be readily understood by one skilled in the art, the aforementioned system 21 does not require the user 23 to be presently accessing the World Wide Web or other information source to use the system. Once the system 21 has collected metadata for all of the accessible media items, the system may be executed locally, whereby the user 23 need not disclose any private history regarding songs stored, accessed, played, etc. Thus, a user 23 may create and enjoy any number of media item playlist collections without concern that information about his listening habits and preferences will be transferred from his personal computing device to a central location (e.g., server).

Methods Utilizing a Seed Media Item

Figure 2:
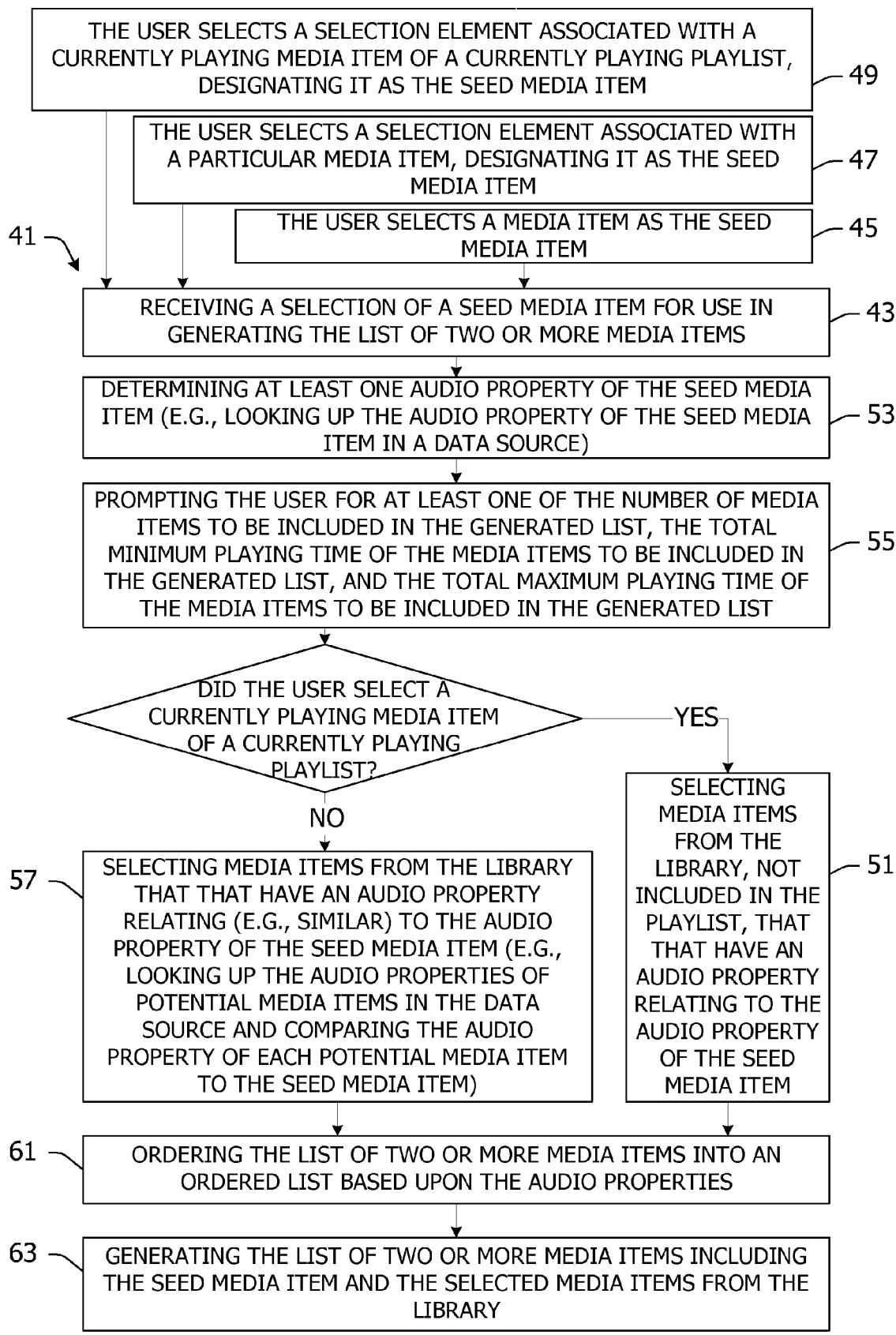
FIG. 2 is a flow diagram of a method of the present invention.

In one exemplary embodiment depicted in FIG. 2, a method, generally indicated 41, for generating a list of two or more media items selected from the library 29 of media items based upon a seed media item is disclosed. In one example utilizing musical media items, the method is designed to create a playlist of media items related to the seed media item capable of creating a radio-style playlist of similar media items with little effort by the user. Such an example is targeted to a user having ready access to a library of media items who would enjoy a playlist targeted to a specific type of music like a typical radio broadcast, but without the time or inclination to fashion a playlist of media items simulating such a broadcast.

In any event, the method comprises receiving, at 43, a selection of a seed media item for use in generating the list of two or more media items (see FIG. 2). The user 23 can select a seed media item in a number of ways. In one example, the user 23 may select, at 45, the seed media item directly. For example, a user 23 interacting with a user interface 25 may select a seed media item with a selection element. In another example, the user 23 can initiate list generation by selecting, at 47, a selection element associated with a particular media item. For example, the user 23 may select a seed media item from a list of media items stored in the library 29. In still another example, the user 23 can initiate list generation by selecting, at 49, a selection element associated with a currently playing media item of a currently playing playlist. For example, a user 23 listening to a playlist may decide that a particular media item represents the type of media the user wishes to hear and select that media item as the seed media item. In one further example of when the user 23 initiates list generation by selecting, at 49, the selection element associated with the currently playing media item of the currently playing playlist, the method selects, at 51, media items not included in the currently playing playlist. This ensures that the new playlist has media items not currently being accessed by the user 23, so that the new playlist will provide a fresh and unique experience for the user. In yet another example, the seed may be selected based upon user behavior with respect to the media items (e.g., a media item highly rated by the user or a media item most often accessed by the user may be designated as the seed).

The method further comprises determining, at 53, at least one audio property of the seed media item (see FIG. 2). As would be understood by one skilled in the art, each media item has its own individual identity. Utilizing audio properties is a way of identifying and categorizing such media items. Such audio properties can include any number of relevant pieces of information related to the media item that may be indicative of the nature of the media item. For example, similarity vectors may be identified for each media item and utilized as an identifier of audio properties of the media item. In other words, such similarity vectors indicate what a particular media item sounds like. In one example, such a similarity vector may comprise twenty (or more) dimensional vectors of single-precision floating point numbers for identifying digital audio based upon multiple physical characteristics of the actual audio (e.g., music) contained in the media item. An example of a similarity vector is shown below as an array of twenty 4-byte single-precision floating point numbers:

−6.946318, 2.086578, 0.361108, 1.221748, 2.837087, 1.386783, 1.966391, 0.448375, −20.897249, −0.975747, 5.043533, −8.346107, 4.418811, 9.238695, 2.234773, −4.468442, −2.617096, 5.547550, −0.960682, −8.863153

Once a similarity vector is determined for each media item, the method may determine the distance between any two media items based upon the difference between the similarity vectors of those items, as would be readily understood by one skilled in the art. In particular, the following patent application describes how to identify the sound or musical qualities of a media item by the contents of the item itself: U.S. patent application entitled Methods, Computer-Readable Media, and Data Structures for Building an Authoritative Database of Digital Audio Identifier Elements and Identifying Media Items, filed Apr. 22, 2005, and assigned to Microsoft Corporation of Redmond, Wash., U.S.A. Such systems and methods may be utilized herein to determine audio characteristics of a particular media item. The details of such systems and methods would be readily understood by one skilled in the art and will not be discussed in greater detail here. Other means for determining an audio property of particular media items are also contemplated as within the scope of the present invention.

In another example, the method may further prompt the user 23, at 55, for the number of media items to be included in the generated list (see FIG. 2). The method utilizes this information from the user 23 to set the number of selected media items. In another example, the method prompts the user, also at 55, for the total minimum playing time of the media items to be included in the generated list. The method utilizes this information from the user 23 to extend the total playing time of the selected media items to be at least as long as the user specifies. In still another example, the method prompts the user 23, also at 55, for the total maximum playing time of the media items to be included in the generated list. The method utilizes this information from the user 23 to limit the total playing time of the selected media items to be no more than the user specifies.

The method further comprises selecting, at 57, media items from the library 29 that have an audio property relating to the audio property of the seed media item (see FIG. 2). In one example, the selecting comprises selecting media items having audio properties similar to the audio properties of the seed media item. Media items sharing such similar audio properties are known to have a similar sound. In an alternate embodiment, the relationship between the audio property of the selected media items and the seed media item could be dissimilarity (e.g., for creating a playlist of songs unlike the seed song). Other relationships between the seed media item and the selected media items are also contemplated as within the scope of the present invention. In another example, the selecting of media items comprises looking up the audio properties of potential media items in the data source 29 and comparing the audio property of each potential media item to the seed media item.

In another exemplary embodiment, the method may comprise ordering, at 61, the list of two or more media items into an ordered list based upon the audio properties (see FIG. 2). For example, media items with similar properties may be ordered adjacent one another, whereby adjacent media items share similar audio properties for a relatively smooth transition between one another. Alternately, the ordering may place dissimilar media items adjacent one another to produce a more eclectic ordering scheme where songs following one another have dissimilar audio properties. In another example, the method may additionally generate, at 63, the list of two or more media items including the seed media item and the selected media items from the library 29. Moreover, the method can provide the playlist to the user 23 via a suitable user interface 25 (FIG. 1), as would be readily understood by one skilled in the art.

Figure 3:
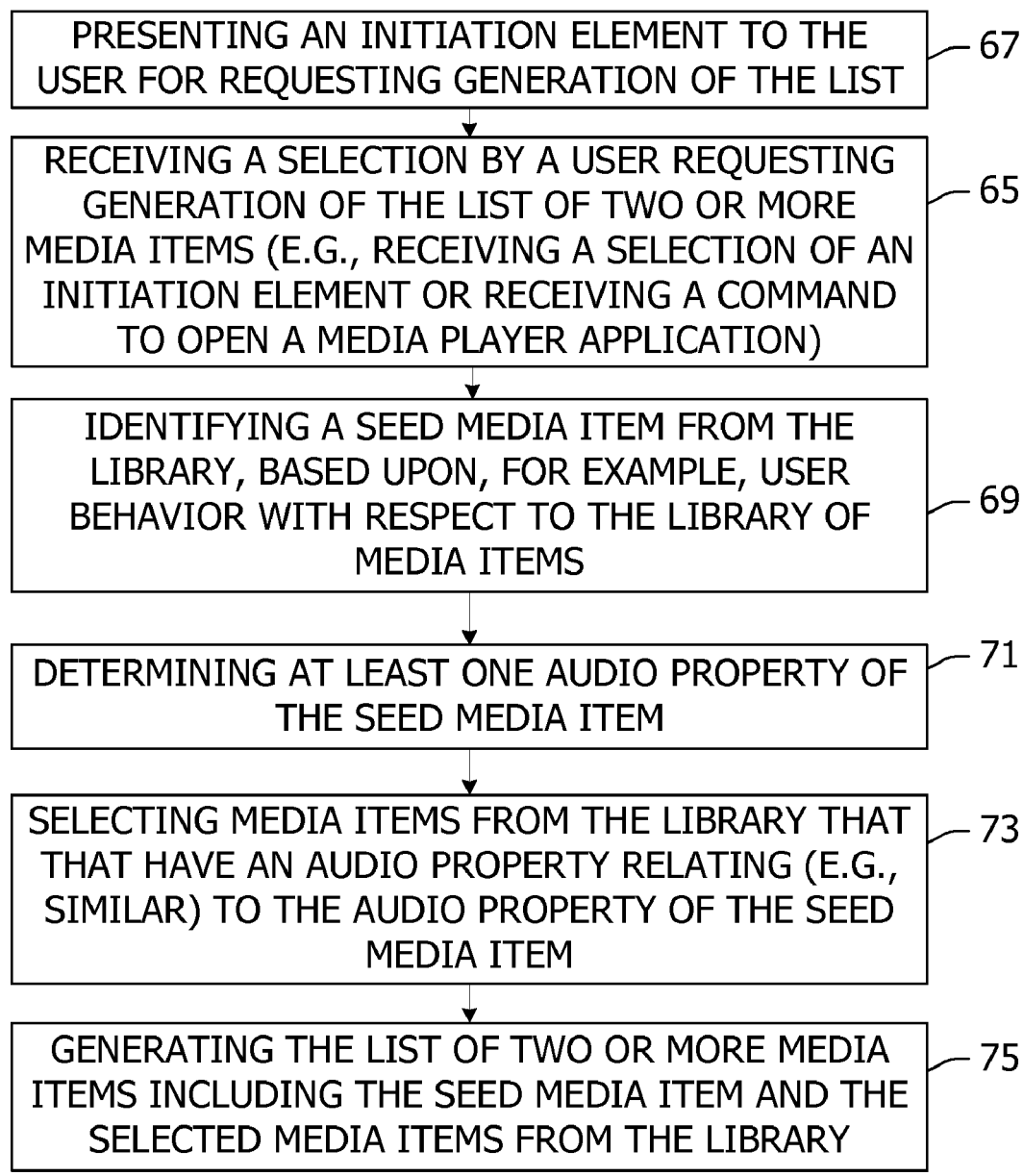
FIG. 3 is a flow diagram of another method of the present invention.

In another alternative embodiment depicted in FIG. 3, a method for generating a list of two or more media items selected from the library 29 of media items is disclosed. The method comprises receiving, at 65, a selection by the user 23 requesting generation of the list of two or more media items. In one example, the receiving a selection by the user 23 comprises receiving a selection of an initiation element or receiving a command to open a media player application. Other actions by the user 23 to initiate such a selection process are also contemplated as alternatives within the scope of the present invention. Such a selection of an initiation element by the user 23 may be in response to a presentation, at 67, of an initiation element to the user for requesting generation of the list.

The method further comprises identifying, at 69, a seed media item from the library 29 (see FIG. 3). In this example, the user 23 need not select a seed media item, as the method will select a seed based upon any number of criteria. In one example, the identification 69 is based upon user behavior with respect to the library 29 of media items. Other methods for identifying a seed media item are also contemplated as alternatives within the scope of the present invention. The method additionally determines, at 71, at least one audio property of the seed media item, generally as set forth above with respect to the embodiment of FIG. 2. The method further comprises selecting, at 73, media items from the library 29 that have an audio property relating to the audio property of the seed media item. In one example, the selecting, at 73, media items comprises selecting media items having audio properties similar to the audio properties of the seed media item, generally as set forth above with respect to the embodiment of FIG. 2. The method additionally generates, at 75, the list of two or more media items including the seed media item and the selected media items from the library 29. Moreover, the method can provide the playlist to the user 23 via a suitable user interface 25 (FIG. 1), as would be readily understood by one skilled in the art.

Figure 4:
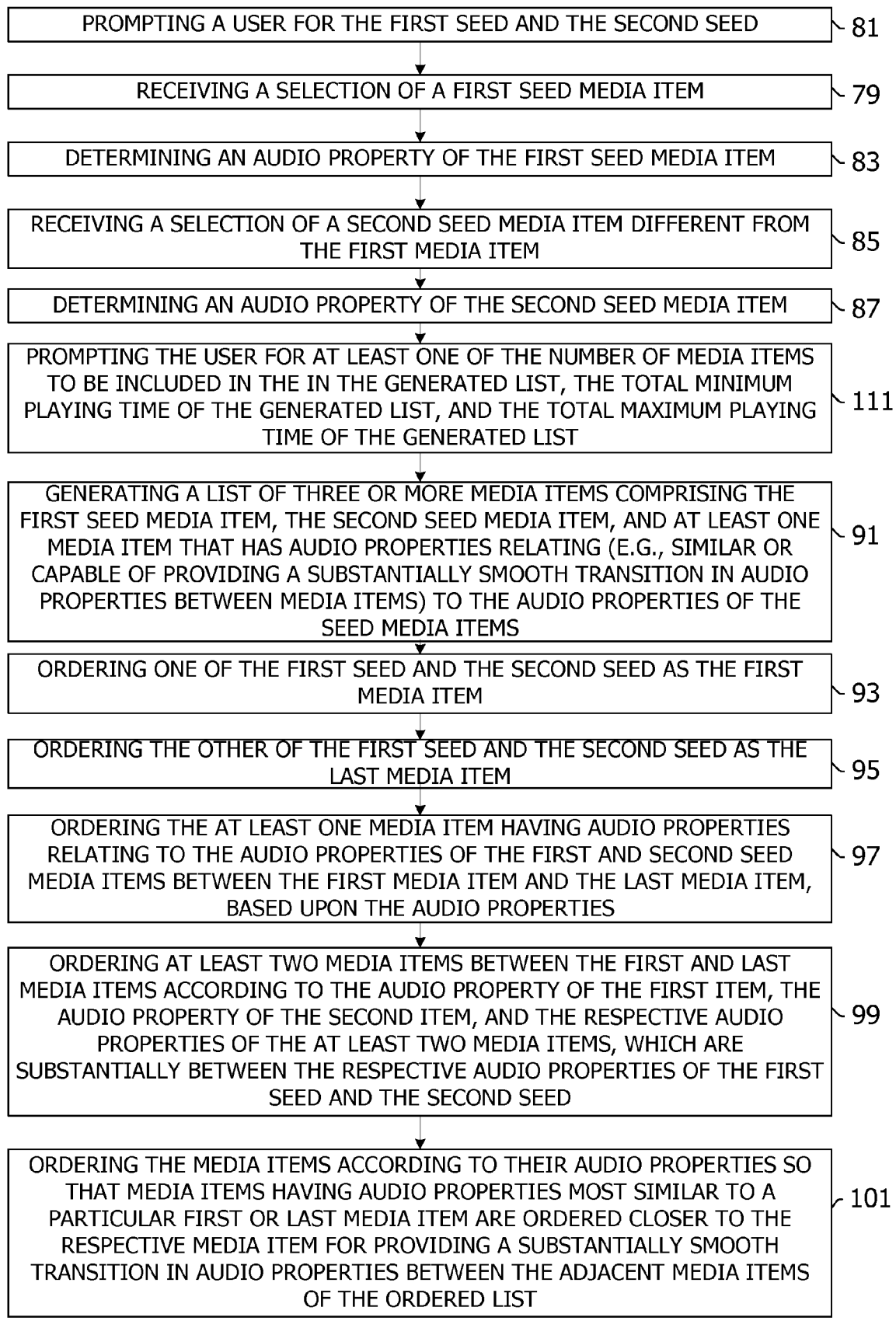
FIG. 4 is a flow diagram of still another method of the present invention.
Figure 5:
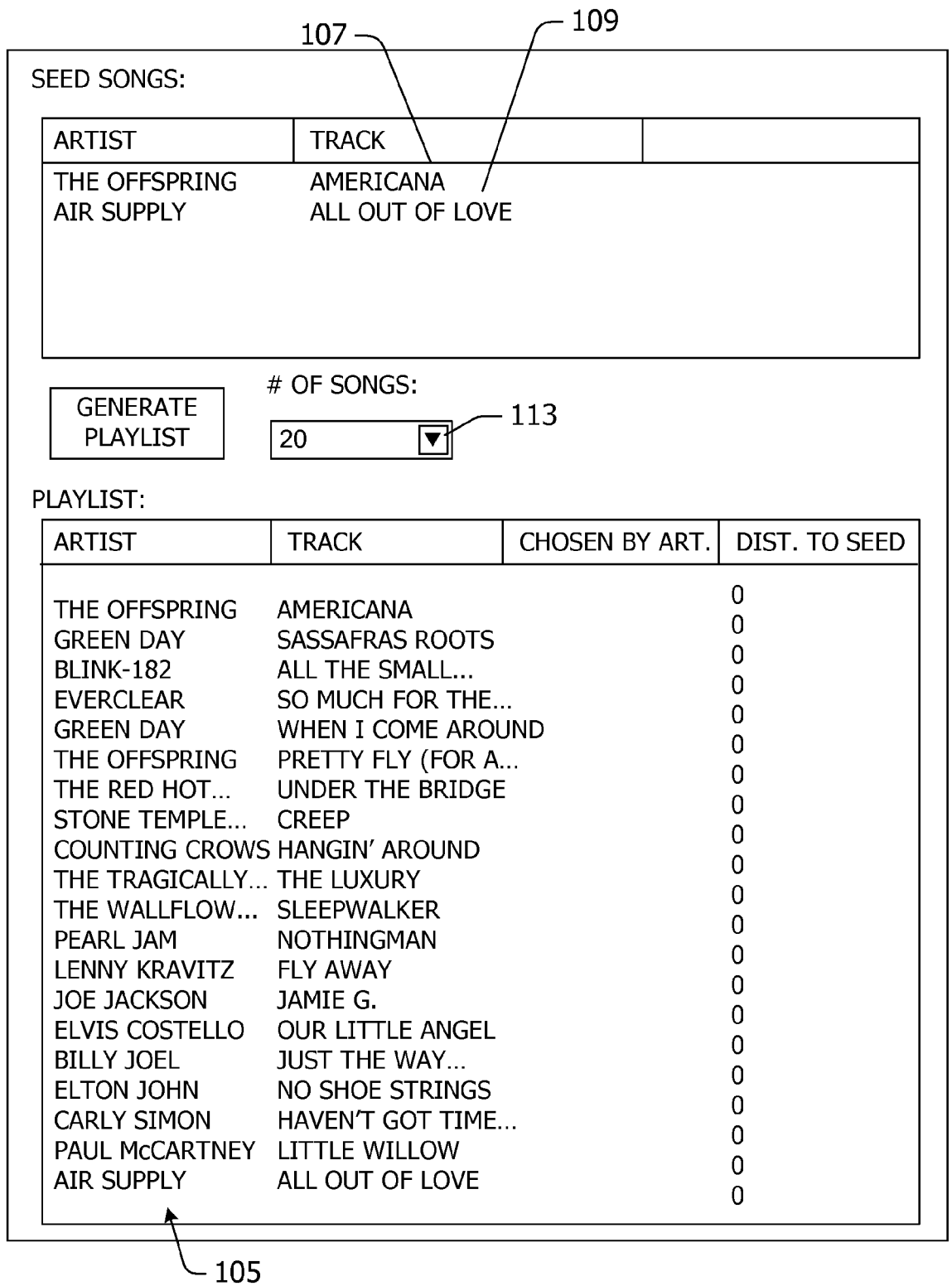
FIG. 5 is a diagram of an exemplary playlist of the present invention.

In yet another alternative embodiment depicted in FIGS. 4 and 5, a method for generating a list of three or more media items selected from a library 29 of media items including at least two received media item selections is disclosed. The method comprises receiving, at 79, a selection of a first seed media item by a user 23. The method may include prompting, at 81, the user 23 for such a first seed media item, or the user may provide the selection without prompting. The method further comprises determining, at 83, an audio property of the first seed media item. The method further comprises receiving, at 85, a selection of a second seed media item by the user 23. The second seed media item is different from the first media item. The method may further include prompting, at 81, the user 23 for such a second seed media item, or the user may provide the selection without prompting. The method further comprises determining, at 87, an audio property of the second seed media item for comparison with the audio property of the first seed media item.

For example, in the exemplary diagram depicted in FIG. 5, the first seed media item is Americana by the artist Offspring and the second seed media item is All Out of Love by the artist Air Supply. These media items are thought to have substantially different audio properties, but the present method is capable of populating a playlist of media items related to both of such divergent seeds, as will be discussed in greater detail below. It is contemplated that the first and second seed media items may be selected by different users 23 without departing from the scope of the present invention.

The method additionally generates, at 91, a list of three or more media items from the library 29. The list comprises the first seed media item, the second seed media item, and at least one media item having audio properties relating to the audio properties of the first and second seed media items. In one example, the audio properties of the selected media item or media items are similar to the audio properties of at least one of the first seed media item and the second seed media item. In a further example, the list of three or more media items may be organized into an ordered list based upon the audio properties of the media items. Such ordering can occur in any number of ways. First, the ordering may comprise ordering, at 93, one of the first seed and the second seed as the first media item in the ordered list. Then, the other of the first seed and the second seed may be ordered, at 95, as the last media item in the ordered list. Placement of the first seed and the second seed media items as the first or last media item of the ordered list may be user-controlled or automatically determined by the method, either arbitrarily or according to some defined criteria.

The media items having audio properties relating to the audio properties of the first and second seed media items may then be ordered, at 97, between the first media item and the last media item. In some examples where more than one selected media items are present, the ordering may comprise ordering, at 99, at least two media items between the first and last media items according to the audio property of the first item, the audio property of the second item, and the respective audio properties of the at least two media items. In this example, the audio properties of the at least two media items are substantially between the respective audio properties of the first seed and the second seed. In other words, according to the audio properties, the selected media items will sound somewhere between the sound of the seed media items. For example, if one seed is a soft rock song and the other seed is a hard rock song, one would expect most of the selected songs to be rock songs, rather than classical or new age songs.

In a further example, the ordering of the at least two media items between the first and last media items comprises ordering, at 101, the media items according to their audio properties so that media items having audio properties most similar to a particular first or last media item are ordered closer to the respective media item for providing a substantially smooth transition in audio properties between the adjacent media items of the ordered list. Referring now to FIG. 5, an exemplary playlist, generally indicated 105, is depicted. Here, the first seed media item 107 is the song Americana by the artist Offspring, and the second media item 109 is the song All Out of Love by the artist Air Supply. The playlist 105 includes an additional eighteen media items selected because they have audio properties substantially between the seed media items 107,109. In this example, one would expect media items of a harder rock variety to be ordered closer to the first seed media item 107 by the artist Offspring and the media items of a softer rock variety to be ordered closer to the second seed media item 107 by the artist Air Supply. That is indeed the case, with media items like Sassafras Roots by the artist Green Day, All the Small Things by the artist blink-182, and So Much for the Afterglow by the artist Everclear near Americana and with media items like Little Willow by the artist Paul McCartney, Haven't Got Time for the Pain by the artist Carly Simon, and No Shoe Strings on Louise by the artist Elton John. As would be readily understood by one skilled in the art, placing such media items in close proximity to others sharing similar audio properties will provide a pleasurable listening experience by providing a relatively smooth transition from the first media item in the playlist 105 to the last. In effect, a user 23 can select a first media item of a particular sound and a second media item of a different sound and have the method fill the playlist with appropriately selected songs for smoothly and pleasurably transitioning between the seed media items by taking the listening experience from the musical proximity of one seed media item to the other.

In another example, the method prompts, at 111, the user 23 for the number of media items to be included in the generated list (FIG. 4). The method utilizes this information from the user 23 to set the number of selected media items in the playlist. In the exemplary playlist 105 of FIG. 5, a drop-down menu 113 allows for selection of the total number of media items in the playlist. In the example shown, the user 23 has selected a playlist 105 of twenty media items. In another example, the method prompts, also at 111, the user 23 for the total minimum playing time of the media items to be included in the generated list. The method utilizes this information from the user 23 to extend the total playing time of the selected media items to be at least as long as the user specifies. In still another example, the method prompts, also at 111, the user 23 for the total maximum playing time of the media items to be included in the generated list. The method utilizes this information from the user 23 to limit the total playing time of the selected media items to be no more than the user specifies.

Moreover, the method can provide the playlist to the user 23 via a suitable user interface 25 (FIG. 1), as would be readily understood by one skilled in the art.

Single Action Systems

Another embodiment of the invention may further comprise a system, also depicted 21 in FIG. 1, for generating a list of media items selected from a library 29 of media items. The system 21 comprises a user interface 25 for displaying information identifying a portion of the library 29 of media items. The user interface 25 displays information identifying the list of media items.

The user interface 25 also comprises a selection component (described in detail below), which in response to performance of only a single action, selects a group of media items from the displayed portion of the library of media items. In one example, the selection component is one of selecting a selection element of the user interface 25, making a selection on a drop-down menu of the user interface, and dragging and dropping the displayed portion of the library of media items within the user interface.

The system 21 further comprises a processor 27 for generating the list of media items with the group of media items (FIG. 1). The detailed operation of such a system is set forth below with respect to the methods and user interfaces of the present invention.

Single Action Methods

Figure 6:
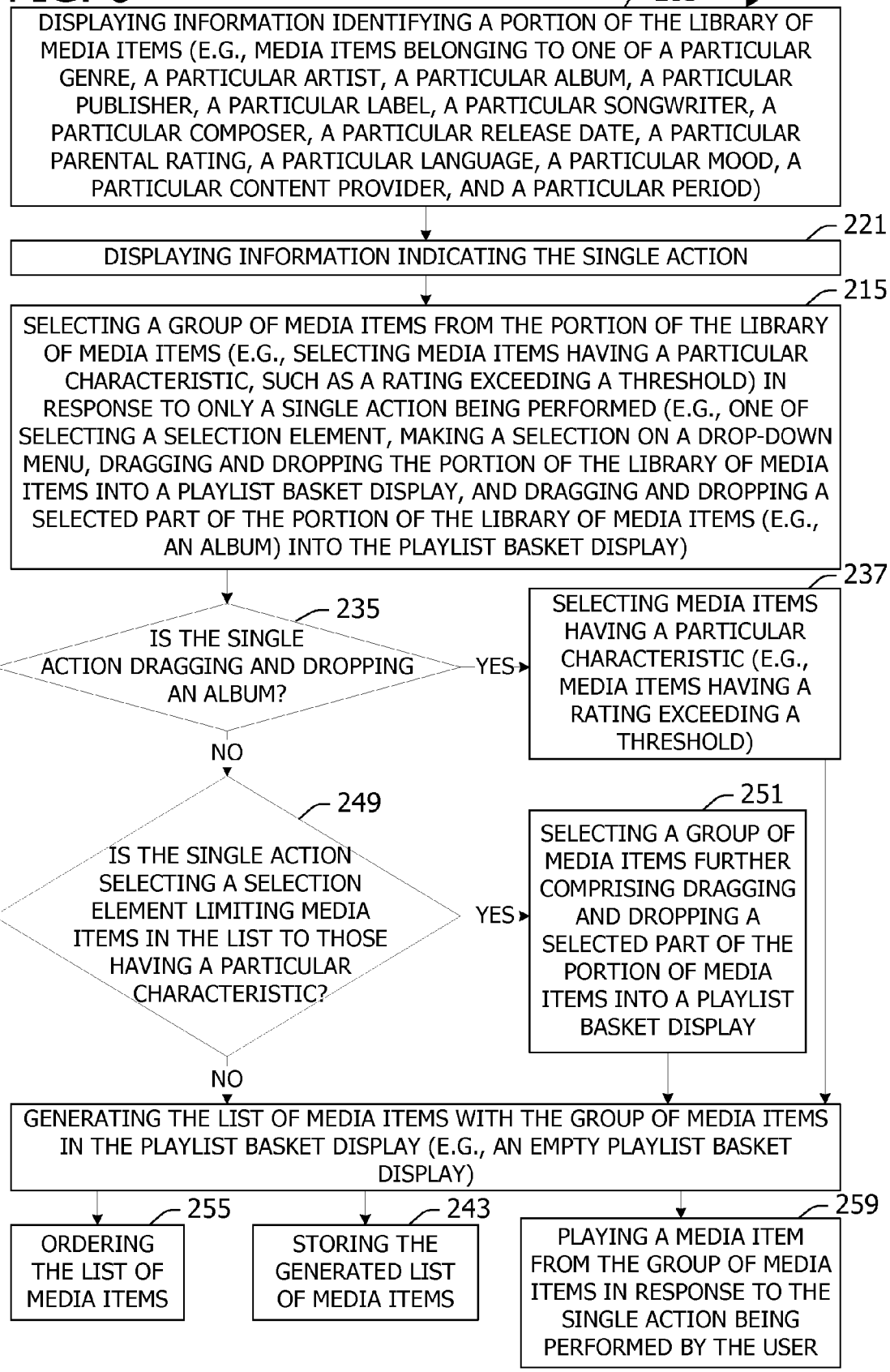
FIG. 6 is a flow diagram of yet another method of the present invention.

Referring now to FIG. 6, a computer-implemented method of operation on one or more data processing devices, generally indicated 201, is disclosed for generating a list of media items selected from a library 29 of media items. The method 201 comprises displaying, at 203, information identifying a portion of the library 29 of media items. This displaying 203 of information may occur on a user interface 25, such as those user interfaces depicted in FIGS. 7-14. For example, the user interface 25A depicted in FIG. 7 includes a display of a portion 207 of the library 29 of media items. The portion 207 displayed includes media items grouped by album 209 with media item listings for each album. Moreover, in some cases, not all of the portion 207 of the library is displayed simultaneously on the user interface 25A and a scroll bar 211 may be utilized to bring other parts of the portion into view. The displaying 203 may further comprise displaying a portion 207 of the library 29 of media items comprising media items belonging to one of a particular category: such as a particular genre, a particular artist, a particular album, a particular publisher, a particular label, a particular songwriter, a particular composer, a particular release date, a particular parental rating, a particular language, a particular mood, a particular content provider, and a particular period. Other alternative categories useful in identifying and grouping media items are also contemplated as within the scope of the present invention. In the example shown in FIG. 7, the user 23 has selected to view all media items belonging to the rock genre by selecting "rock" from a series of cascading drop-down menus 213. This particular series of cascading drop-down menus first requires selection of media type (e.g., audio items, video items, etc.), followed by selection of the library 29 (e.g., local library, subscription library, etc.), followed by selection of a category (e.g., genre, artist, album, year, songs, etc.), and finally a sub-category of the selected category (e.g., rock). Other alternative cascading drop-down menus are also contemplated as within the scope of the present invention, as the drop-down menu depicted here is exemplary only. Other means for displaying a portion 207, rather than an entire library 29, of media items based upon common characteristics (e.g., genre, artist, etc.) are also contemplated as alternatives within the scope of the present invention.

Figure 7:
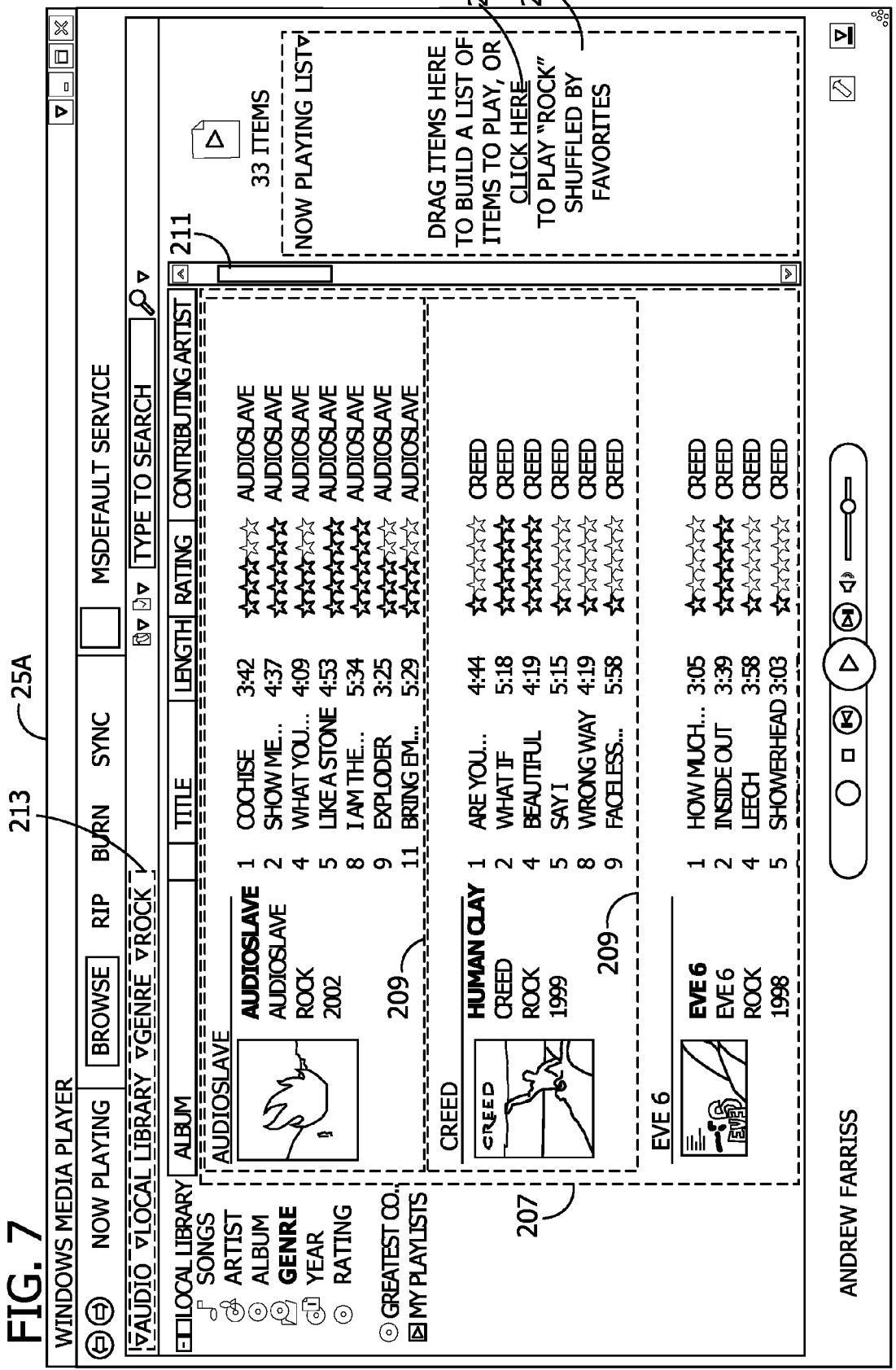

The method further comprises selecting, at 215, a group of media items from the portion 207 of the library 29 of media items (FIG. 6). This selecting, at 215, is in response to only a single action being performed, for example by the user 23. By performing only a single action, the user 23 may trigger the selection of a group of media items from the portion 207. Any single action may be utilized without departing from the scope of the present invention. For example, the single action may be one of selecting a selection element (e.g., a hyperlink 217 as depicted in FIG. 7), making a selection on a drop-down menu, dragging and dropping the portion 207 of the library 29 of media items into a playlist basket display 219, and dragging and dropping a selected part of the portion of the library of media items into the playlist basket display. Each of these single actions will be discussed with particularity below.

In the embodiment shown in FIG. 7, the hyperlink 217 instructs the user 23 to "click here" to play Rock genre media items shuffled by favorites. In this example, performing the single action of selecting, at 215, the hyperlink 217 instructs the method to select a group of media items from the portion 207 based upon particular criteria. For instance, the method may select those media items having a four-star or five-star rating. In the case of the first album 209 displayed by the artist Audioslave, the method would select only media items numbered 2, 5, 8, and 12, as each of those media items includes a four-star or five-star rating. The media items numbered 1, 4, 9, 11, 13, and 14 having three-star ratings are not selected because they are not considered favorites. This selection selects only those media items that are both favorites and categorized within the portion 207 of the library 29, here the genre "rock," desired by the user 23. This selection may be deemed more pleasing to the user 23 than simply selecting the favorite media items from the entire library 29. Other alternative criteria (e.g., media item duration, year of release, etc.) for selecting media items in response to the single action of selecting the hyperlink 217 are also contemplated as alternatives within the scope of the present invention. The method may further comprise displaying information indicating the single action, at 221. For example, in FIG. 7 the hyperlink 217 is accompanied by text describing the function of the hyperlink and the ability to drag and drop media items into the playlist basket display 219, as will be discussed in greater detail below.

Figure 8:
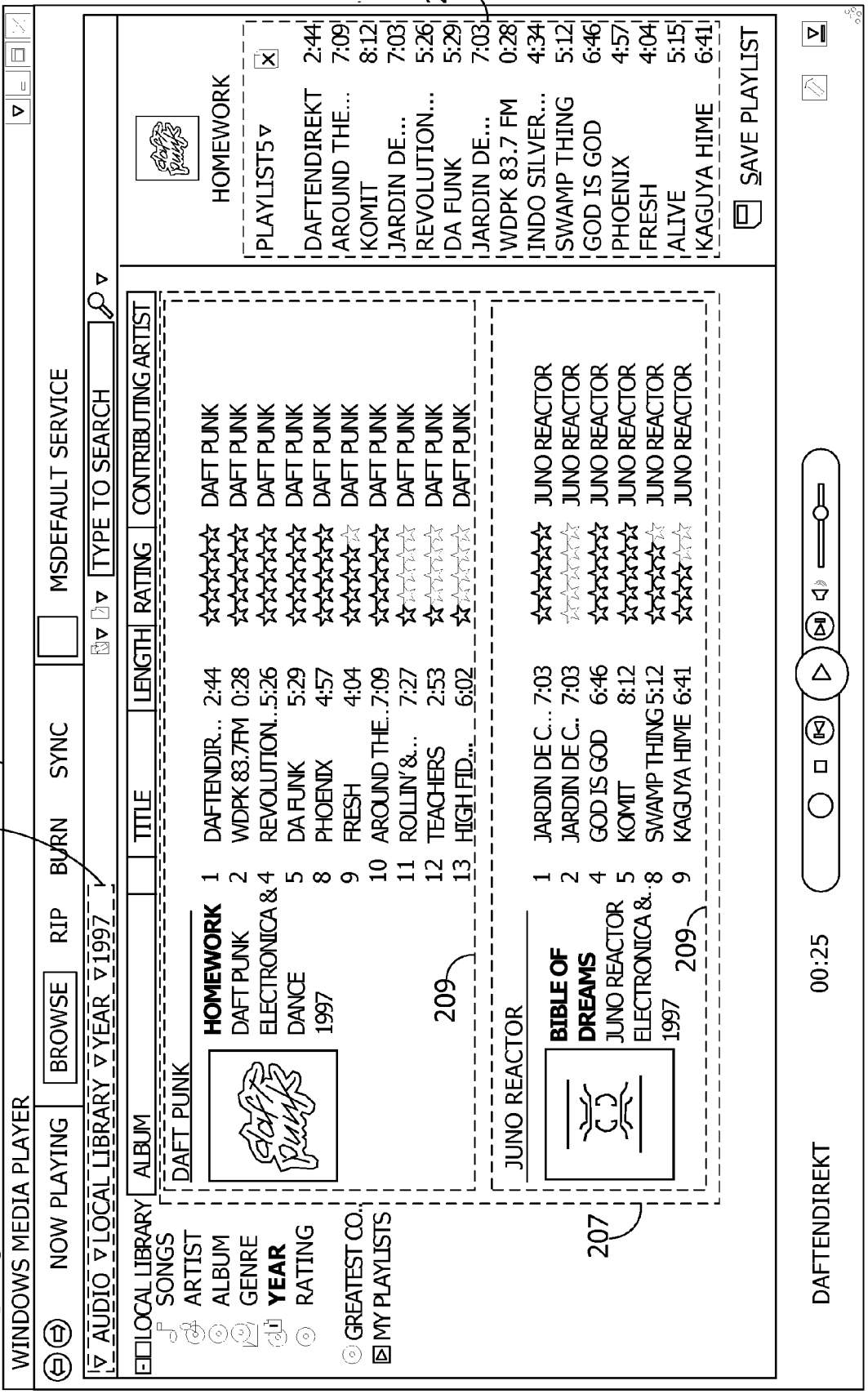
Figure 9:
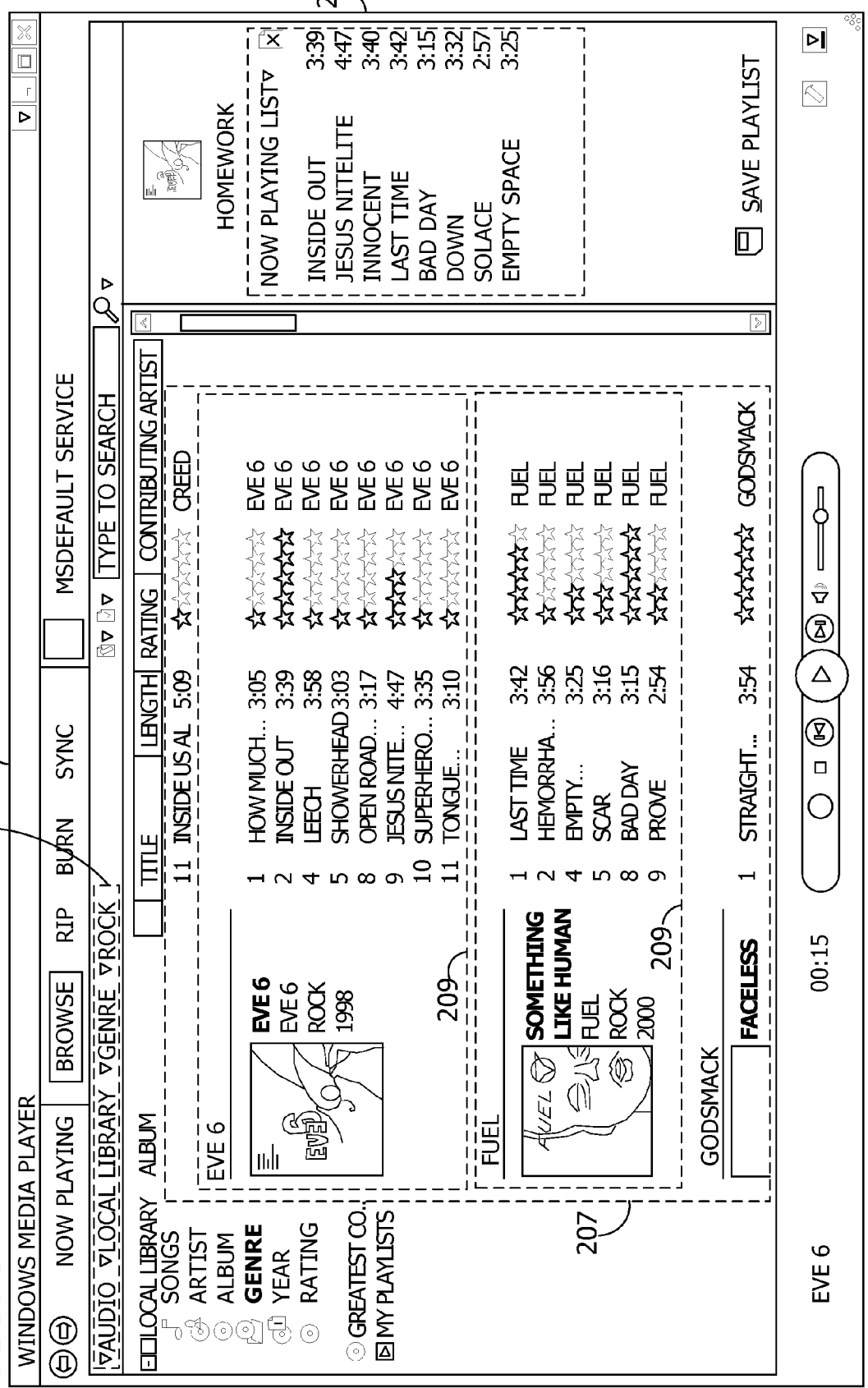

The benefits of such a selection process are further demonstrated by comparing the exemplary user interfaces 25B, 25C of FIGS. 8 and 9. The user interfaces 25B,25C each displays a portion 207 of the library 29 of media items categorized by albums 209, a playlist basket display 219, and a series of drop-down menus 213, generally as set forth above with the user interface 25A of FIG. 7. Referring first to FIG. 8, all media items displayed in the portion 207 of the user interface 25B are selected for display in the playlist basket display 219 in response to the single action of the user 23. In contrast to the user interface 25A of FIG. 7, however, even those media items rated with only one-star rating are included in the playlist basket display 219 for playing. Such a selection process may not be as pleasing to the user 23 because the playlist contains media items that are not favorites of the user.

In contrast, the user interface 25C of FIG. 9 is adapted to select those media items rated as favorites, demonstrating the result of selecting the hyperlink 217 of the user interface 25 of FIG. 6 to select those media items that are favorites for the playlist basket display 219. For simplicity, the playlist basket display 219 of FIG. 8 only includes those media items selected from the two albums 209 fully displayed in the figure (i.e., the EVE 6 album by the artist Eve 6 and the SOMETHING LIKE HUMAN album by the artist Fuel), rather than each of the albums included in the portion 207, as described above with respect to FIG. 6. In any event, the media items selected for the playlist basket display 219 include item 2 from the Eve 6 album 209 and items 1, 5, and 11 from the Fuel album. Each of these selected items is a favorite and has at least a four-star rating.

The selecting process may end here, selecting only those media items having a four-star or five-star rating. In the alternative embodiment depicted in FIG. 9, however, media item 6 from the Eve 6 album and media items 3, 8, and 9 from the Fuel album are additionally selected for inclusion in the playlist basket display 219. Each of these additional media items has a three-star or a two-star rating, thereby providing additional media items for the playlist basket display 219. Such an approach is aimed at more smoothly tapering the cutoff for non-selection of media items, thereby relaxing the selecting of media items only above a particular threshold. For example, the method may take into consideration other characteristics of the media items to further refine the selecting process. In one example, the average rating of the album 209 where the media item is from is considered when selecting media items. Thus in the example of FIG. 9, the average star rating on the Eve 6 album is 1.5 stars, while the average star rating on the Fuel album is 2.6 stars. Taking the popularity of each album into consideration, more Fuel media items with three-star or two-star ratings are selected comparably rated Eve 6 media items because of the relative popularity of the Fuel album compared with the Eve 6 album. Other considerations in selecting particular media items over others are also contemplated as alternatives within the scope of the present invention.

It should be understood here that the method further generates the list of media items with the selected group of media items. In one example, generating of the list of media items comprises generating the list of media items in an empty playlist basket display 219. In the example shown in FIG. 7, only when the playlist basket display 219 is empty is the hyperlink 217 displayed. Once one or more media items is displayed in the playlist basket display 219, the user 23 must take another single action (e.g., dragging and dropping or a drop-down menu) for selecting additional media items for display in the playlist basket display.

In another alternative embodiment depicted in FIG. 10, a user interface 25D displays a portion 207 of the library 29 of media items categorized alphabetically by albums 209, a playlist basket display 219, and a series of drop-down menus 213, as set forth generally above. Furthermore, the user interface 25D includes an "Add Favorites to List" selection element 231 within a drop-down menu, generally indicated 233, associated with a single album (e.g., the album HUMAN $C_{LAY}$ by the artist Creed). Selecting the selection element 231 selects those media items having a particular characteristic, such as those having a rating exceeding a threshold, and places them in the playlist basket display 219. Each of the albums in the portion 207 may be individually selected (such as by right-clicking a mouse 182) to display a drop-down menu 233 associated with that particular album for selecting media items with a single action.

Figure 11:
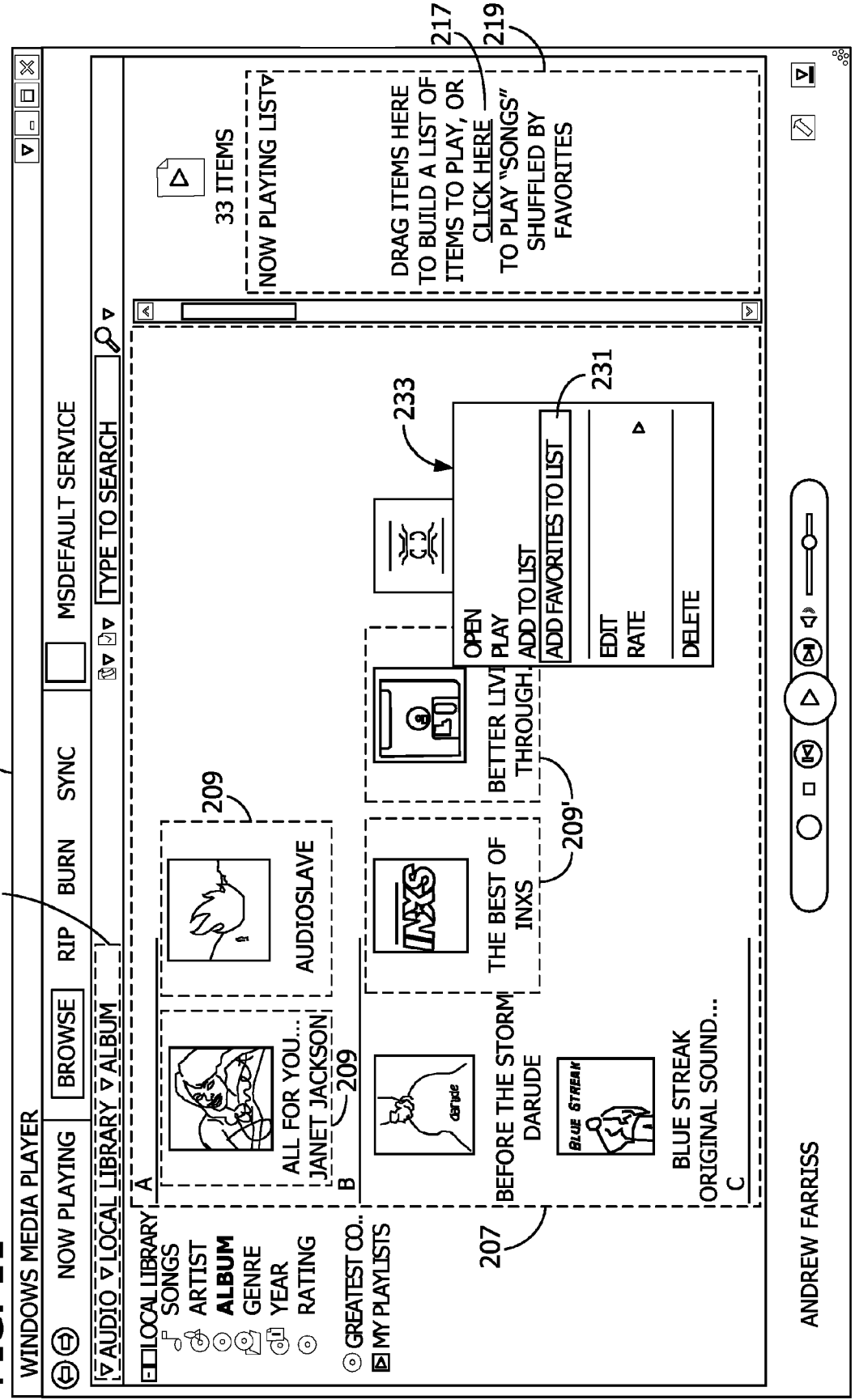

In yet another alternative embodiment depicted in FIG. 11, another user interface 25E is depicted. The user interface displays a portion 207 of the library 29 of media items categorized alphabetically by albums 209, a playlist basket display 219, and a series of drop-down menus 213, as set forth generally above. In this example, two albums 209' are depicted as highlighted, or selected, by a user 23, the album THE BEST OF INXS by the artist INXS and the album BETTER LIVING THROUGH CHEMISTRY by the artist Fatboy Slim. The media items of such albums 209' may then be added to the playlist basket display 219 in multiple ways. In the example of FIG. 10, the user 23 may either drag and drop, at 235 (see FIG. 6), the selected part of the portion 207 of the library 29 (i.e., the albums) into the playlist basket display 219 or select the "Add Favorites to List" selection element 231 associated with a drop-down menu, generally indicated 233, associated with the selected albums 209'. Either single action of dragging and dropping into the playlist basket display 219 or selecting the selection element 231 selects media items, at 237 (see FIG. 6), having a particular characteristic (e.g., favorites). Furthermore, in a more specific instance of this example, the selecting may further comprise selecting media items having a star rating exceeding a threshold (e.g., more than a three-star rating). This user interface 25E also comprises a hyperlink 217 to select those media items that are favorites for the playlist basket display 219, generally as set forth above.

Figure 12:
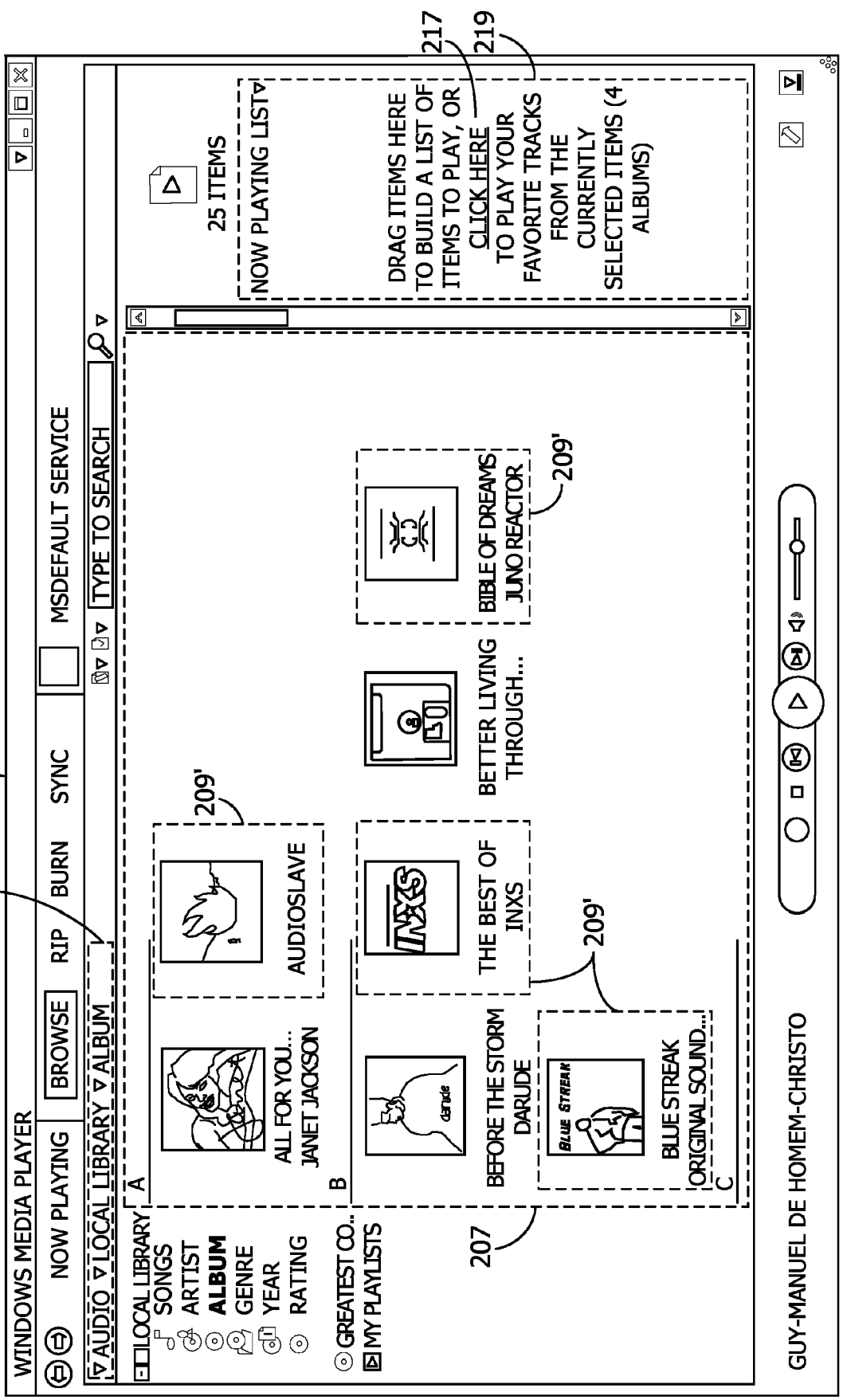
Figure 13:
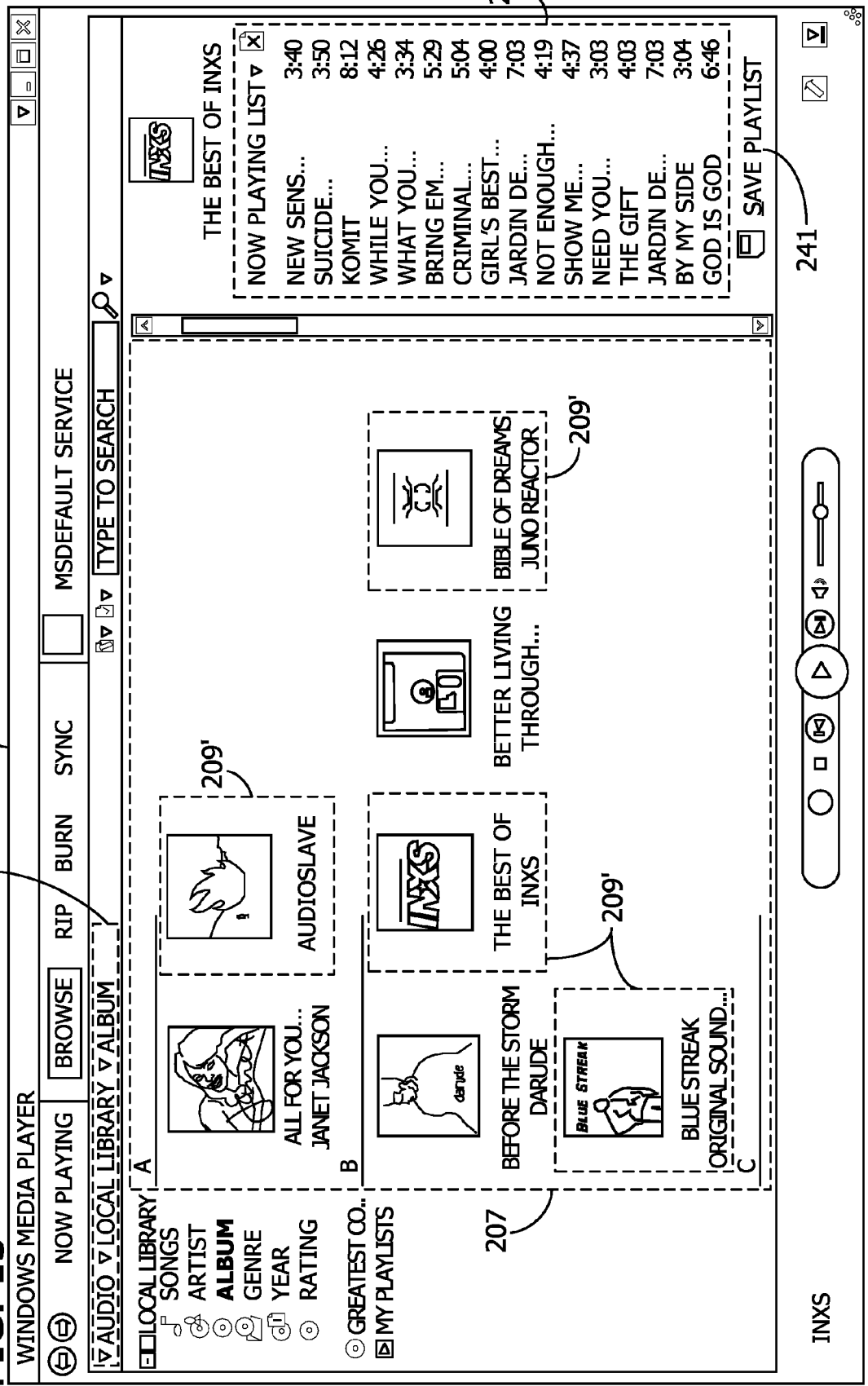

In still another alternative embodiment depicted in FIGS. 12 and 13, a user interface 25F displays a portion 207 of the library 29 of media items categorized alphabetically by albums 209, a playlist basket display 219, and a series of drop-down menus 213, as set forth generally above. In addition, four albums 209' are depicted as selected by the user 23. In FIG. 12, the user 23 may drag and drop this group of albums 209' into the playlist basket display 219, thereby signaling the method to select those media items from the albums having particular characteristics (e.g., those designated favorite media items). The user 23 may also select the hyperlink 217 to select those media items that are favorites for the playlist basket display 219, generally as set forth above. Referring now to FIG. 13, the selected media items are shown in the playlist basket display 219 after selection by the method. It should be noted here that not all of the media items contained on the four albums 209' are included, but only those that are favorites. It should also be noted in the example of FIG. 13, that an additional storing element 241 is displayed adjacent the selected media items, which when selected stores, at 243 (see FIG. 6), the generated playlist of media items for future use.

Figure 14:
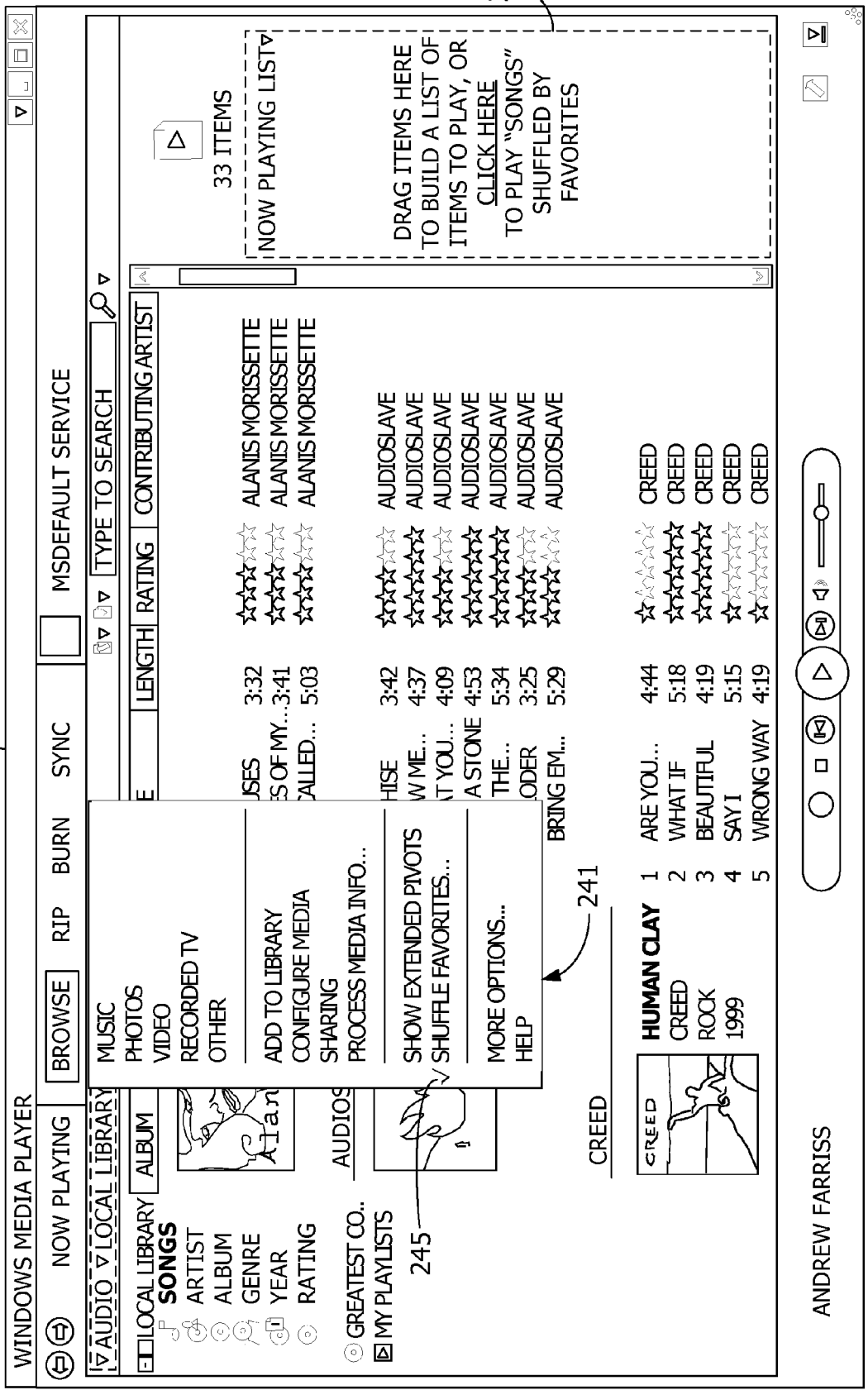

In yet another alternative embodiment depicted in FIG. 14, a user interface 25G generally as set forth above further comprises a universal drop-down menu, generally indicated 241, for setting user preferences regarding behavior of the method when any portion 207 of the library 29 is dragged and dropped into the playlist basket display 219. The drop-down menu includes a selection element 245 entitled "Shuffle favorites on drag and drop" which may be toggled off and on. When not selected (i.e., toggled off), any dragging and dropping of an album 209, or albums, into the playlist basket display 219 will result in the selecting of all media items from the album, or albums, in the playlist basket display. When selected, at 249 (see FIG. 6), any dragging and dropping, at 251, of an album 209, or albums, into the playlist basket display 219 will result in the selection of only favorite media items (e.g., four and five-star media items) from the album, or albums, dropped in the playlist basket display. By toggling this selection element 245 on, the user 23 can simply drag and drop albums rapidly into the playlist basket display 219 while the method of the present invention selects only those media items from the album, or albums, deemed to be favorites for generation of the playlist. This saves considerable time and effort in creating playlists and provides a selective process whereby the media items selected are user favorites.

The method may further comprise ordering, at 255 in FIG. 6, the list of selected media items. This ordering may be governed by any number of separate rules, including ordering by media item star rating, by order of their selection into the playlist, by media item duration, by time last accessed, by alphabetical order, among others. Any ordering scheme for the media items is contemplated as an alternative within the scope of the present invention. In addition, the method may further comprise playing, at 259, a media item from the group of media items in response to the single action being performed by the user 23.

Single Action User Interfaces

A user interface 25 for generating a list of media items selected from a library 29 of media items is disclosed herein and described in detail above. The user interface 25 comprises a candidate media item display for displaying a portion 207 of the library 29 of media items and a playlist basket display 219 for displaying media items to be played. The user interface 25 further comprises a selection element (e.g., hyperlink 217) selectable by a user with a single action for selecting a group of media items from the displayed portion of the library of media items and populating the playlist basket display 219 with such selected media items. In one example, the single action performed by the user is selecting a selection element 245 (see FIG. 14) limiting media items selected for inclusion in the playlist basket display 219 to those having a particular characteristic. In another example, the selection of the selection element with a single action performed by the user additionally begins playing the media items in the group.

General Purpose Computing Device

Figure 15:
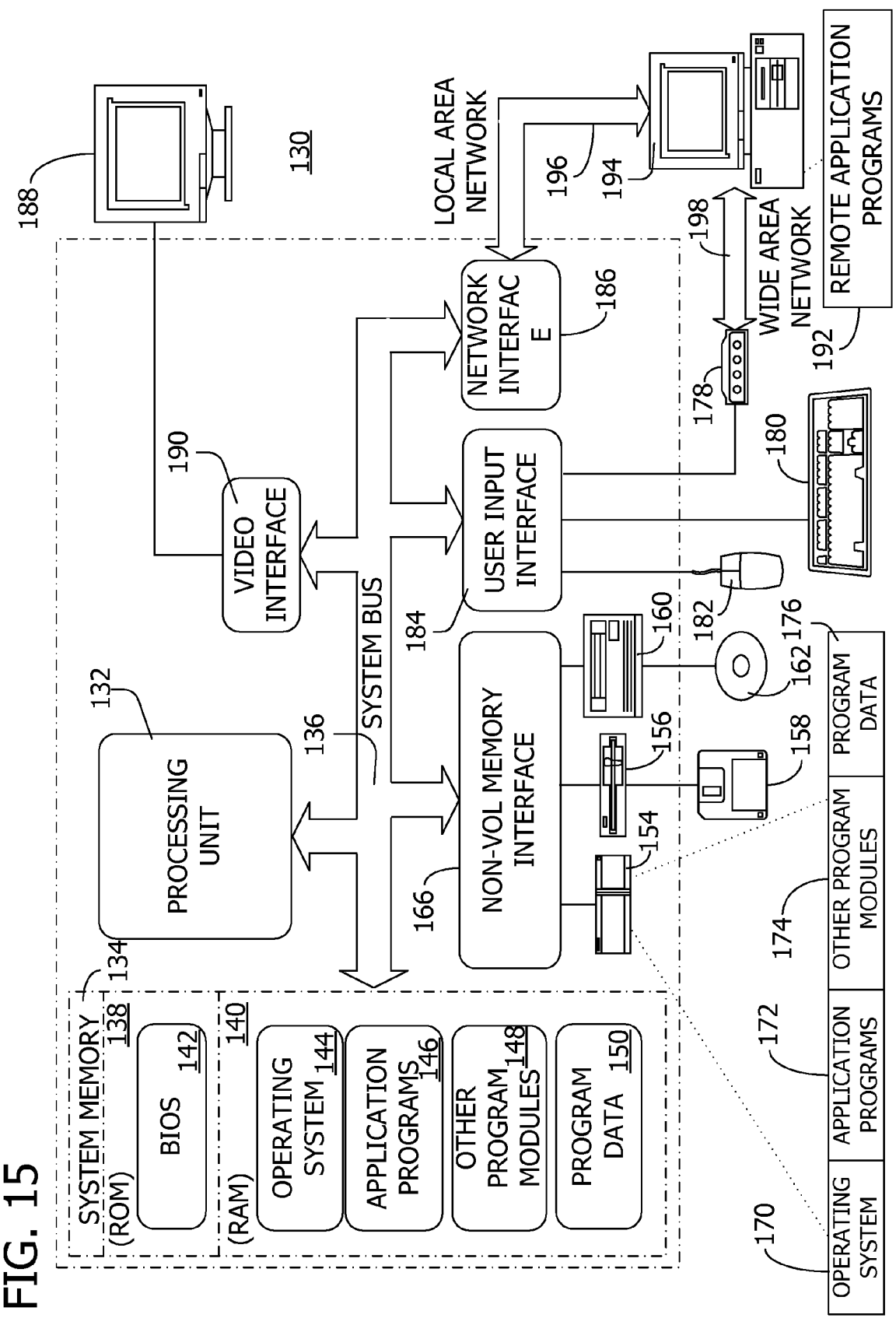
FIG. 15 is a block diagram illustrating one example of a suitable computing system environment in which the invention may be implemented.

FIG. 15 shows one example of a general purpose computing device in the form of a computer 130. In one embodiment of the invention, a computer such as the computer 130 is suitable for use in the other figures illustrated and described herein. In one example, the system 21 discussed above may be embodied by computer 130. Computer 130 additionally has one or more processors or processing units 132 and a system memory 134. In one example, the processor 27 discussed above may be embodied by processors or processing units 132. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. In one example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 15 illustrates operating system 144, application programs 146, other program modules 148, and program data 150.

The drives or other mass storage devices and their associated computer storage media discussed above and illustrated in FIG. 15, provide storage of computer readable instructions, data structures, program modules and other data for the computer 130. In FIG. 15, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user 23 may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, camera, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown). In one example, the user interfaces discussed above may be embodied by such input devices and monitors.

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 15 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 15 illustrates remote application programs 192 as residing on the memory device. It will be appreciated that the network connections shown are exemplary and other means of establishing a communications link between the computers may be used.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the embodiments of the invention are operational with numerous other general purpose or special purpose computing system environments or configurations. The computing system environment is not intended to suggest any limitation as to the scope of use or functionality of the embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, computer 130 executes a computer-implemented method of operation on one or more data processing devices such as described above for generating a list of media items selected from a library of media items. The computer 130 (or its components) displays information identifying a portion of the library of media items. The computer 130 (or its components) selects a group of media items from the portion of the library of media items in response to only a single action being performed. The computer 130 (or its components) generates the list of media items with the group of media items.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A computer-implemented method of operation on one or more data processing devices for generating a list of media items selected from a library of media items, said method comprising:
   displaying a series of cascading drop-down menus, wherein the drop-down menus provide for selection by a user of one or more of the following: media type, library, category, and subcategory;
   displaying information identifying a portion of the library of media items, said identified portion of the library of media items corresponding to one or more selections by the user from the drop-down menus;
   displaying a hyperlink selection element independent of the displayed information identifying the portion of the library, wherein the displayed hyperlink selection element is a function of the selections by the user from the drop-down menus;
   in response to only a single action being performed by the user, selecting a group of media items from the identified portion of the library of media items, wherein the single action comprises selecting the hyperlink selection element by the user without selecting any media item from the identified portion of the library of media items, and wherein the selected group represents a subset of the identified portion of the library of media items; and
   in response to the selected hyperlink selection element only and not in response to any other action by the user, generating the list of media items with the selected group of media items.

2. The computer-implemented method of claim 1 wherein the selecting the group of media items further comprises selecting media items having a particular characteristic.

3. The computer-implemented method of claim 2 wherein the selecting the group of media items further comprises selecting media items having a rating exceeding a threshold.

4. The computer-implemented method of claim 1 wherein said displaying information comprises displaying a portion of the library of media items comprising media items belonging to one of a particular genre, a particular artist, a particular album, a particular publisher, a particular label, a particular songwriter, a particular composer, a particular release date, a particular parental rating, a particular language, a particular mood, a particular content provider, and a particular period.

5. The computer-implemented method of claim 1 wherein said generating the list of media items comprises generating the list of media items in an empty playlist basket display.

6. The computer-implemented method of claim 1 further comprising ordering the list of media items.

7. The computer-implemented method of claim 1 further comprising storing the generated list of media items.

8. The computer-implemented method of claim 1 further comprising playing a media item from the group of media items in response to the user selecting the hyperlink selection element.

9. A system for generating a list of media items selected from a library of media items, said system comprising:
   a user interface for displaying a series of cascading drop-down menus and information identifying a portion of the library of media items, said drop-down menus providing for selection by a user of one or more of the following: media type, library, category, and subcategory, said identified portion of the library of media items corresponding to one or more selections by the user from the drop-down menus, said user interface comprising a selection component that in response to performance of only a single action by the user, selects a group of media items from the identified portion of the library of media items, wherein the selection component comprises a hyperlink selection element that is a function of the selections by the user from the drop-down menus, and wherein the single action comprises:
      selecting hyperlink selection element by the user without selecting any media item from the identified portion of the library of media items, and wherein the selected group represents a subset of the identified portion of the library of media items; and
   a processor for generating the list of media items with the selected group of media items in response to the selected hyperlink selection element only and not in response to any other action by the user.

10. The system of claim 9 wherein the user interface displays information identifying the list of media items.

11. A user interface for generating a list of media items selected from a library of media items, said user interface comprising:
   a candidate media item display for displaying a portion of the library of media items, said portion of the library of media items corresponding to one or more selections by a user from a series of cascading drop-down menus, wherein the drop-down menus provide for selection by the user of one or more of the following: media type, library, category, and subcategory;
   a playlist basket display for displaying media items to be played; and
   a hyperlink selection element selectable by the user with a single action for selecting a group of media items from the displayed portion of the library of media items and populating the playlist basket display with such selected media items, said hyperlink selection element being a function of the selections by the user from the drop-down menus, and wherein the hyperlink selection element populates the playlist basket display with a subset of the portion of the library of media items;
   and wherein the hyperlink selection element selects the group of media items and populates the playlist basket display in response to the single action only and not in response to any other action by the user.

12. The user interface of claim 11 wherein said single action performed by the user is selecting a selection element limiting media items selected for inclusion in the playlist basket display to those having a particular characteristic.

13. The user interface of claim 11 wherein said selection of the selection element with a single action performed by the user additionally begins playing the media items in the group.

* * * * *